United States Patent
Carmichael

[11] 3,906,145
[45] Sept. 16, 1975

[54] MOUNTING SYSTEM FOR ELECTRICAL FIXTURES

[76] Inventor: Charles D. Carmichael, 37332 Park Ave., Willoughby, Ohio 44094

[22] Filed: Aug. 30, 1973

[21] Appl. No.: 392,999

[52] U.S. Cl. .................. 174/61; 174/48; 174/55
[51] Int. Cl.² ........................................ H02G 3/14
[58] Field of Search ............ 174/54, 48, 49, 61, 55, 174/53; 248/343, 27; 240/78 R, 78 DA

[56] References Cited
UNITED STATES PATENTS

| | | | |
|---|---|---|---|
| 1,488,078 | 3/1924 | Vandy | 248/343 |
| 1,685,620 | 9/1928 | White | 248/343 |
| 3,137,763 | 6/1964 | Jones | 174/61 |
| 3,389,884 | 6/1968 | Ault | 248/27 X |
| 3,676,570 | 7/1972 | Gabb | 248/343 |

Primary Examiner—J. V. Truhe
Assistant Examiner—David A. Tone
Attorney, Agent, or Firm—Teare, Teare & Sammon

[57] ABSTRACT

The invention relates generally to a mounting system for electrical fixtures and includes a support device for mounting electrical fixtures on a wall structure, or the like. The device includes a generally hollow body defined by opposed end and side walls extending outwardly from a front wall. The front wall is divided with a centrally disposed opening adapted to provide ingress and egress for electrically connecting a fixture to an electrical box. The front wall is provided with attachment means for detachably mounting the device to the fixture and/or to the electrical box. In another form, the elongated hollow body is made integral with and extends outwardly from the front wall and is closed at one end to provide an electrical box for securement therein of electrical conductors for connection to the fixture.

11 Claims, 4 Drawing Figures

MOUNTING SYSTEM FOR ELECTRICAL FIXTURES

BACKGROUND OF THE INVENTION

The present invention relates in general to a mounting system for electrical fixtures or the like, and more particularly relates to a support device for mounting electrical fixtures on a supporting structure, such as on an interior or exterior wall, ceiling or the like. In one form, the support device is of a unitary one-piece construction which can be quickly and easily applied to an existing electrical ceiling box or electrical fixture box, for example. Another form, the device includes an integral hollow body extending outwardly therefrom providing electrical box for housing electrical conductors for connection to a fixture.

Heretofore, difficulties have been encountered in mounting electrical fixtures on support structures, particularly when mounting an electrical fixture on the exterior side of a dwelling having irregular, such as lapped type siding or the like. In such cases, such problems have resided primarily in the difficulty in mounting the electrical fixture on the irregular surface or the inclined surface provided by the lapped-type siding. This would not only provide an unsightly appearance, but would not result in mounting the fixture with a weather-tight seal around the fixture. For example, in such cases the siding was often times merely cut-out and the fixture mounted over the opening without a substantial support. In these arrangements, the openings were often times irregular, oversized or undersized, making the installation cumbersome and time consuming. Accordingly, there has been a need in the industry to provide a mounting system which has extreme flexibility and which enables quick and easy mounting of interior or exterior fixtures under many varying conditions.

SUMMARY OF THE INVENTION

The present invention relates to a mounting system for fixtures, and more particularly relates to a support device for electrical fixtures including a generally polygonally shaped body defined by opposed end and said walls which extend outwardly from a front wall providing a generally box-like construction which is open on one side. The front wall is provided with a generally centrally disposed opening to provide ingress and egress to an electrical box for causing conductors used for connection with the fixture. The front wall of the device is provided with attachment means for detachably connecting the device to the fixture and/or to the electrical box. In another form, an integrally elongated hollow body extends outwardly from the front wall and is closed at one end to provide a unitary electrical box with the device for housing electrical conductors therein.

From the foregoing description and accompanying drawings, it will be seen that the present invention provides a novel support device for quickly and easily mounting electrical fixtures on any type of conventional electrical box. In the invention, the fixture is enabled to be mounted quickly and easily on the regular type surfaces, such as on lapped-type siding, but which mounts fixture in a squared or parallel relation with the general plane of the supporting structure. The device is readily adapted to mounting with practically all types of fixtures and practically all parts of electrical boxes so as to minimize the number of units required to be purchased or stored. The device is of a simple, yet light weight construction with high durability for all-weather applications and which may be painted or color impregnated to color match the decor of the support structure. In addition, the device can be mounted in a positive manner, yet which can allow adjustability between the parts and which can be readily sealed, such as by caulking or the like, to provide a weather-tight construction.

DESCRIPTION OF THE PREFERRED EMBODIMENTS

Figure 1:
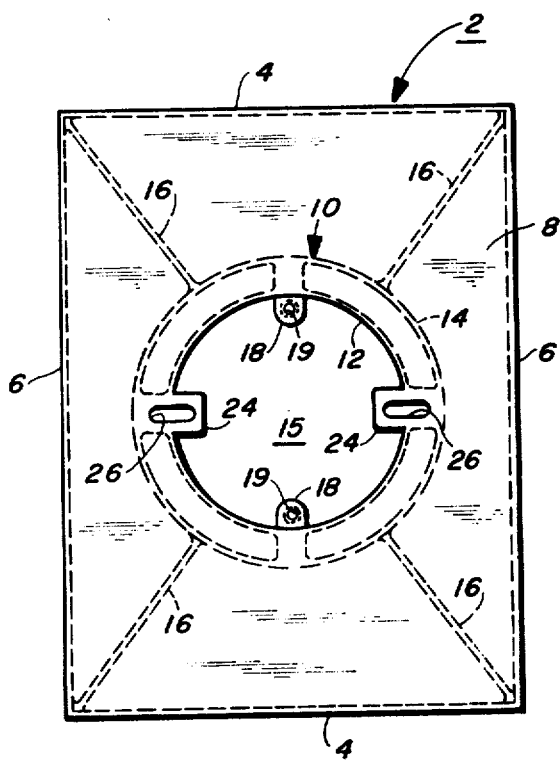
FIG. 1 is a top plan view of the support device made in accordance with the invention.
Figure 2:
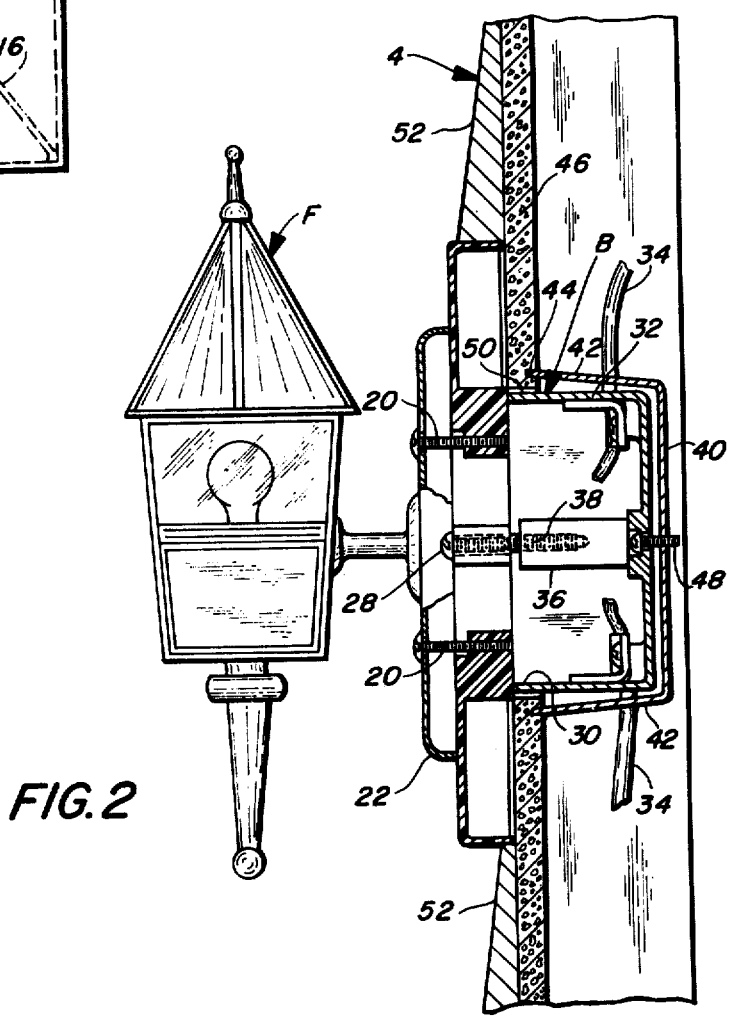
FIG. 2 is a fragmentary, side elevation view, partly in section, illustrating the support device mounting electrical fixture on a wall structure.

Referring again to the drawings, and in particular to FIGS. 1 and 2 thereof, there is illustrated, generally at 2, a fixture support bracket member for mounting a fixture F, such as in interior or exterior light fixtures, on a wall via an electrical box member B disposed in co-acting relationship with respect thereto. In the form shown, the support bracket 2 may be employed practically with any type of electrical fixture and may be employed with any type of electrical box, such as a ceiling box, fixture box or the like. In the embodiment hereafter described, the support bracket member 2 may be made from any suitable material such as plastic, wood, metal or the like. Preferably, the member is made from a light weight, high strength polymeric material which may be impregnated or otherwise painted so as to match the particular decor for the given installation thereof.

In the form shown in FIGS. 1 and 2, the bracket member 2 is preferably made of a unitary one-piece construction adapted for mounting connection with the electrical box B for mounting the fixture F. As shown, the bracket member 2 is preferably of a polygonal, such as rectangular, configuration defined by a pair of outwardly disposed end walls 4 and a pair of outwardly disposed side walls 6 which are disposed in upstanding relation and made integral with a front supporting wall 8 which is of a planar construction. The walls 4 and 6, together with the front wall 8, together join a box-like construction which is hollow so as to provide light weight characteristics to the bracket member. In the embodiment shown, the bracket member 2 includes a centrally arranged web-like construction, designated generally at 10, including a first inner concentric wall 12 and a second outer concentric wall 14 disposed centrally of the front wall 8. The inner concentric wall 12 provides a generally circular opening 15 to provide ingress and egress for mounting the electrical fixture F and for assembly with the electrical box B. The outer concentric wall 14 is spaced radially outwardly of the wall 12 and has a series of ribs, or webs, 16 which extend radially outwardly and are made integral at the respective corners with the side walls 4 and 6. In the form shown, the walls 12 and 14 and the webs 16 are made integral with the front wall 8 and with the webs 16 made integral at one end with the wall 14 and at the opposite end with the juncture between the walls 4 and 6 at each of the corners thereof. In a preferred form, the diameter of the opening 15 defined by the inner wall 12 is approximately the same as that of the diameter of the electrical box B so as to provide a generally uninterrupted passageway therebetween.

In the embodiment shown, to provide a mounting connection between the bracket member 2 and the fixture F, and between the bracket member 2 and the electrical box B, there is provided a generally radially disposed lug construction. As shown, the member 2 includes a first pair of lug member 18 which are generally of identical construction. The lugs 18 are preferably rounded at their ends and are made integral with the inner wall 12 generally at their mid-point and with the outer wall 14 at their ends. Preferably, the lugs 18 are coextensive in height with the walls 12 and 14 and with the webs 16 so that all such elements are disposed in the same general plane. The lugs 18 are provided with fitted bores, as at 19, so as to receive a suitable fastener 20, such as a screw or the like, for mounting the base 22 (FIG. 2) of the fixture F on the bracket member 2. For connecting the bracket member 2 to the electrical box B, a second pair of lugs 24 is provided which are generally of identical construction. As shown, the lugs 24 are similarly made integral generally at mid-point with the inner wall 12 and at ends with the wall 4 and are preferably spaced 90° apart from the lugs 18. In this form, the lugs 24 include elongated slots 26 which extend therethrough adapted to receive suitable fasteners 28, such as screws, (only one shown in FIG. 2) for securement of the electrical box B to the rear side of the bracket member 2. Accordingly, in the form shown, the wall 14 has a thickness and diameter so that the confronting outer peripheral edge, as at 30, of the electrical box B fits flush against the surface thereof. Moreover, by this arrangement, there is provided lateral adjustability between the bracket member 2 and the electrical box B to enable adjustment of the parts, as desired.

In the form shown, the electrical box B is of a generally conventional construction, including a generally cylindrical box-like body 32 having knock-out (not shown) for receiving electrical conductors 34 therethrough as known in the art. The body 32 may be provided with integral lengthwise extending lugs 36 (only one shown) which are threaded, as at 38, for receiving the fasteners 28 therethrough for mounting with the bracket member 2, as aforesaid. To provide mounting with the wall 4, the body 32 may be provided with a generally U-shaped spring-clip which has a base or bight portion 40 and a pair of integral divergently extending arms 42 of spring-like construction adapted for abutting engagement, as at 44, into the fibrous wallboard material 46 of the wall 4. The spring clip may be detachably connected to the body 32 of the electrical Box B by one or more fasteners 48, as known in the art. By this arrangement, the body 32 of the electrical box B is simply inserted through a hole 50 provided in the wallboard 46 which contracts the spring portion 42 until the length of the body has been inserted through the opening 50, whereupon the spring portion 42 will snap outwardly so as to be drawn down via the fastener 48 and into abutting engagement, as at 44, with the wallboard 46, as known in the art.

To assemble the members, there is simply provided an opening 50 in the wallboard 46 prior to application of the siding members 52 which constitute the wall 4. In such case, the electrical box B may be pre-assembled with the bracket member 2 via the fasteners 28 with the electrical box B being inserted through the opening 50 and mounted on the wallboard 46, as aforesaid. Upon such installation, the electrical fixture F may then be quickly mounted on the bracket member 2 via the fasteners 20 for completion of the installation after connection of the electrical conductors 34 to the fixture F. In such case, the siding member 52 can then be brought into abutting engagement with the transacting end walls 4 and side walls 6 of the bracket member 2, whereupon, suitable caulking may be provided to provide the weather-tight seal at the juncture between the bracket member 2 and the confronting edges of the siding members 52. Accordingly, the bracket member 2 is disposed in a substantially flat, flush fitting relation on the exterior side of the wallboard 46 with the siding member 52 completely surrounding the bracket member 2, thereby avoiding the necessity for cutting oversize holes in the wallboard and/or siding and obviating the need for cutting holes in the siding or otherwise utilizing various types of backing members for mounting the fixture F in a level relationship with respect to the side wall 4.

Figure 3:
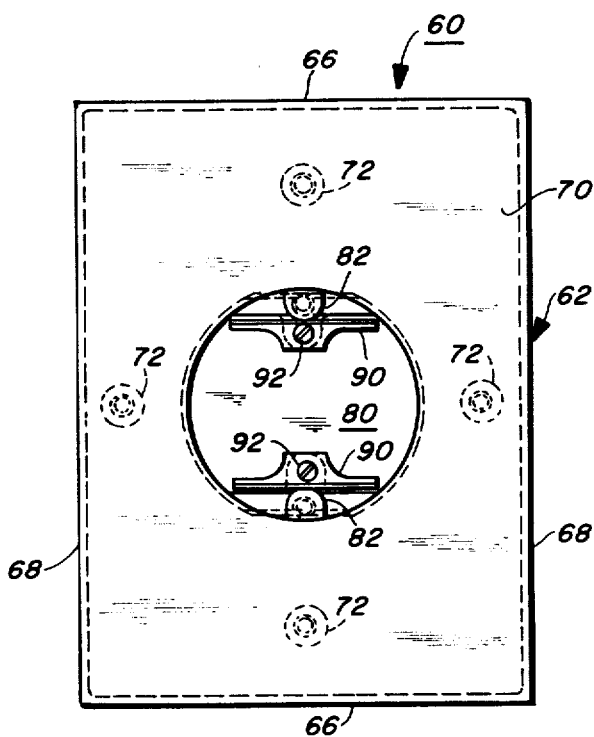
FIG. 3 is a top plan view illustrating a modified form of the support device of the invention.
Figure 4:
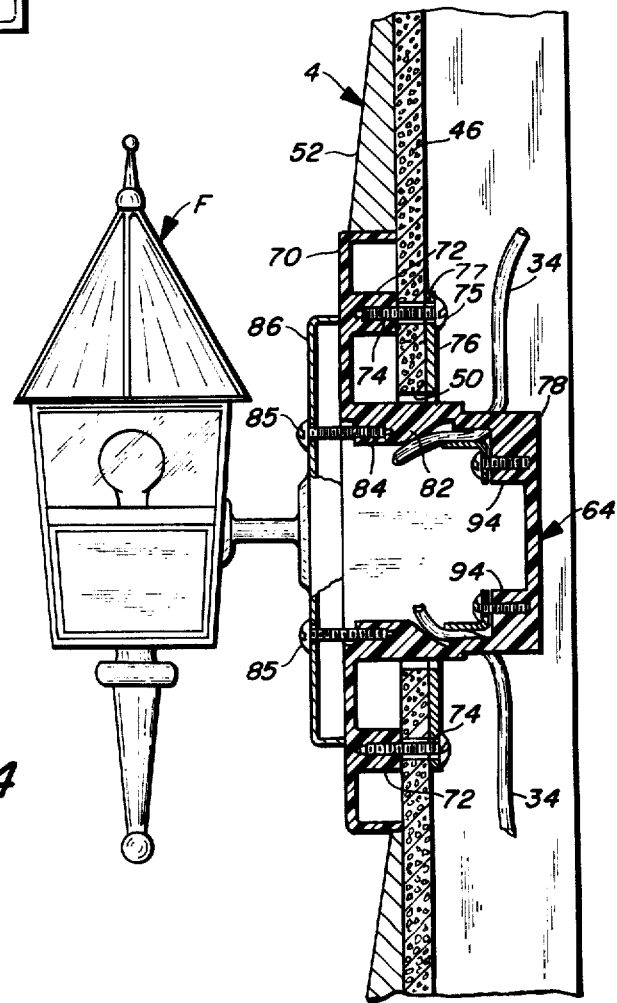
FIG. 4 is a fragmentary, side elevation view, partly in section, illustrating the use of the support device of FIG. 3 for mounting electrical fixture on a wall structure.

Referring to FIGS. 3 and 4, there is illustrated a modified form of the support bracket member, designated generally at 60 for mounting electrical fixture F on a wall 4 structure. In this form, the bracket member 60 includes a base member 62 and an integral box member 64 for mounting on the wall structure. As shown, the base member 62 is of a polugonal, such as rectangular, configuration defined by opposed parallel end walls 66 and opposed parallel side walls 68 which are made integral with and extend outwardly from a generally flat front wall 70. The walls 66 and 68, together with the wall 70, provide a hollow construction to provide a light weight, high strength support. In the form shown, the base member 62 may be provided with a series, such as 4, of bosses or lugs 72 which may be internally threaded, as at 74, (FIG. 4), so as to threadably receive a suitable fastener 75, such as screws, or the like, for securement to the wallboard 46. In this case, a flat annular ring element 76 (FIG. 4) may be provided with suitable apertures, as at 77, for coaction with the fasteners 75 in mounting the base member 62 on the wallboard 46. In this form, the lugs 72 are preferably disposed at the mid-point of the respective walls 66 and 68 and extend rearwardly outwardly from the wall 70 and have a length such that the terminal ends thereof are disposed in the same general plane with the interior edges of the walls 66 and 68, as best seen in FIG. 4.

In this form, an integral preferably cylindrical body 78 extends outwardly from and is centrally disposed with respect to the front wall 70. Moreover, the lugs 72 are radially disposed with respect to the body 78 which defines an inner circular opening 80 (FIG. 3) to provide ingress and egress to the interior of the body 78 which provides the electrical box 64 for the bracket member 60. As shown, the member 62 may be provided with a pair of oppositely disposed interior lugs 82 which may be interiorly threaded, as at 84 (FIG. 4), so as to receive suitable fasteners 85, such as screws or the like, for mounting the base 86 of the fixture F in supported relation against the confronting outer surface of the wall 70.

In the form shown, the electrical conductor 34 may be disposed through suitable knock-outs (not shown) for disposition interiorly of the body 78 for connection with the electrical fixture F, as known in the art. In this case, the conductors 34 may be mounted in place by repair clips 90 which are pivotally mounted as at 92, by screws or the like, on upstanding lugs or shoulders 94 (FIG. 4) which provides an abutment upon which the clips 90 may be drawn for securing the conductor 34 is locked relation between the confronting interior surface of the body 78 and the confronting interior surface of the clip. Such type of clip and abutment arrangement may be provided in the embodiment of the electrical box B illustrated in FIGS. 1 and 2. In this form of the invention, the bracket members 60 may be similarly mounted in respect to the mounting of the embodiment illustrated in FIGS. 1 and 2, except that the base 86 of the fixture F need only be attached to the confronting surface of the outer wall 70 of the member 62 via the fasteners 85, since the member 60 is mounted through the opening 50 in the wallboard 56 and secured in place via fasteners 75 coacting with the plate or ring 76 and the member 62.

I claim:

1. A support device for mounting an electrical fixture on a support structure comprising,
    a hollow body defined by a pair of opposed end walls and a pair of opposed side walls,
    said end and side walls being integrally joined to and extending outwardly from the rear surface of a generally flat front wall,
    an endless inner side wall disposed inwardly of said end and side walls and connected to and defining a central opening in said front wall dapted to provide ingress and egress to an electrical box for electrical connection with said electrical fixture, and
    attachment means on said body including at least one pair of oppositely disposed threaded lugs made integral with said inner side wall for threadably connecting the electrical fixture to said body.

2. A support device in accordance with claim 1, wherein
    said attachment means includes at least one other pair of oppositely disposed lugs made integral with said inner wall and disposed in spaced relation to said first mentioned lugs, and
    said other pair of lugs having elongated slots adapted to receive fasteners for adjustably mounting said body on said electrical box.

3. A support device in accordance with claim 2, wherein
    both pairs of said lugs extend radially inwardly toward one another in circumferentially spaced relation in respect to said inner wall.

4. A support device in accordance with claim 2, wherein said slots extend outwardly from said central opening into said front wall.

5. A support device in accordance with claim 2, wherein
    said central opening is of a generally circular configuration, and
    said lugs of said one pair of lugs are spaced 90° apart from said lugs of said other pair of lugs.

6. A support device in accordance with claim 1, including
    an outer endless wall disposed in concentric spaced relation in respect to said inner wall, and
    a plurality of rib elements connecting said end and side walls to said outer wall.

7. A support device in accordance with claim 6, wherein
    said end and side walls and said inner and outer walls and said ribs are all disposed in the same general plane on the rear surface of said front wall.

8. A support device for mounting an electrical fixture on a support structure comprising,
    a hollow body defined by a pair of opposed end walls and a pair of opposed side walls,
    said end and side walls being integrally joined to and extending outwardly from a generally flat front wall,
    an endless hollow second body disposed inwardly of said end and side walls and having a closed end at one end and an opening at the opposite end connected to an defining a central opening in said front wall to provide ingress and egress to said second body for electrical connection with said electrical fixture, and
    attachment means on said device for detachably connecting said device to said electrical fixture.

9. A support device in accordance with claim 8, wherein
    said second body includes attachment means disposed interiorly thereof for securement with electrical conductors.

10. A support device in accordance with claim 8, wherein
    said second body includes knock-outs in its closed end adapted to be removed for inserting electrical conductors into the interior of said second body.

11. A support device in accordance with claim 8, wherein
    said second body includes at least one shoulder disposed interiorly thereof, and
    a clip is pivotally mounted on said shoulder for securing an electrical conductor in locked relation between the confronting interior surface of said second body and the confronting interior surface of said clip.

* * * * *